United States Patent [19]

Peterson

[11] 4,222,209
[45] Sep. 16, 1980

[54] CORNERPIECE FOR USE IN MULTIPLE PANE WINDOW

[75] Inventor: Wallace H. Peterson, Burnaby, Canada

[73] Assignee: Peterson Metal Products, Ltd., Coquitlam, Canada

[21] Appl. No.: 881,900

[22] Filed: Feb. 27, 1978

[51] Int. Cl.² .......................... E16B 7/00; E06B 7/12
[52] U.S. Cl. ........................................ 52/172; 52/790; 403/295; 403/401
[58] Field of Search .......... 52/172, 616, 656, 788–790, 52/397–403; 403/295, 401

[56] References Cited

U.S. PATENT DOCUMENTS

| | | |
|---|---|---|
| 1,729,586 | 9/1929 | Lieberman . |
| 1,795,028 | 3/1931 | Keller . |
| 2,004,727 | 6/1935 | Keller . |
| 2,291,913 | 8/1942 | Nicolai . |
| 2,377,684 | 6/1945 | Firner . |
| 2,915,793 | 12/1959 | Berg . |
| 2,925,633 | 2/1960 | Morgan et al. . |
| 3,183,560 | 5/1965 | Brichard ............................ 52/656 X |
| 3,208,446 | 9/1965 | Hopkins et al. . |
| 3,280,523 | 10/1966 | Stroud et al. ......................... 52/172 |
| 3,290,076 | 12/1966 | Tarte . |
| 3,304,108 | 2/1967 | Hamilton et al. ................. 52/656 X |
| 3,553,913 | 1/1971 | Eisenberg ............................. 52/172 |
| 3,782,054 | 1/1974 | Goss ................................... 52/656 X |
| 3,786,612 | 1/1974 | Baker . |
| 3,848,390 | 11/1974 | Anderson et al. ................. 52/656 X |
| 3,866,380 | 2/1975 | Benson ............................... 52/616 X |
| 4,080,482 | 3/1978 | Lacombe .......................... 52/616 X |

FOREIGN PATENT DOCUMENTS

| | | | |
|---|---|---|---|
| 1006052 | 3/1977 | Canada ................................... 52/172 |
| 1008307 | 4/1977 | Canada ................................... 52/172 |

Primary Examiner—J. Karl Bell
Attorney, Agent, or Firm—Christensen, O'Connor, Johnson & Kindness

[57] ABSTRACT

A cornerpiece for multiple pane windows comprises an integrally formed sheet metal piece having orthogonally extending members which are received in the adjacent ends of tubular spacer bars separating the panes of glass in a multiple pane insulating window. The tubular spacer bars form a frame which is interposed between the panes of glass, and the cornerpiece is formed so as to be closely received within the ends of the tubular members, thereby joining adjacent tubular members. The cornerpiece is formed so as to block the ends of the spacer bars to prevent a desiccant that is typically placed in the spacer bars from leaking out of the ends of the spacer bars.

16 Claims, 10 Drawing Figures

CORNERPIECE FOR USE IN MULTIPLE PANE WINDOW

BACKGROUND OF THE INVENTION

This invention relates to multiple pane insulating windows and, more particularly, relates to a cornerpiece for joining adjacent spacer bars used to separate the panes of a multiple pane insulating window.

It is well-known in the art to provide a window having more than one pane of glass, the panes being separated by an airspace. Such windows are known as insulating windows by virtue of the fact that the air trapped within the space between the panes of glass serves as an insulator to reduce heat flow through the window panes. It is common in such windows to separate the panes of glass by a frame comprised of sections of tubing joined together at adjacent ends and lying between the panes and extending around the perimeter of the window panes. These tubes are commonly made of aluminum. In order to prevent the window panes from fogging, it is necessary to keep the air which is trapped between the window panes as dry as possible. A desiccant, for example, silica gel, is oftentimes placed into the spacer tubes to absorb moisture from the air trapped within the space between the window panes. In order to prevent the desiccant from settling to the bottom of the tubular spacer frame when the window is in an upright position, it is necessary to block the ends of the sections of spacer bar to keep the desiccant within the separate sections of the spacer.

Prior attempts at providing a cornerpiece which both joins the spacer tubes and blocks the ends of the tubes are shown in U.S. Pat. Nos. 3,553,913 and 3,280,523. Most prior art spacers have comprised solid blocks of material inserted into the ends of the bars. Many of these blocks have been composed of zinc or zinc alloy. It is undesirable to use such solid pieces of zinc to block the ends of the tubes for at least two reasons; one is the fact that by using solid blocks of zinc a great deal of material is used, resulting in a higher production cost and an increased weight of the assembled unit; and secondly, the electrolytic reaction between the zinc plug and the aluminum tubing causes a rapid deterioration of the zinc plug and the formation of the zinc oxide which weakens the strength of the corner joint. Also the white, powdery zinc oxide finds its way into the space between the window panes causing an unsightly deposit on the interior of the window. It is also possible to make the solid end plugs of the prior art out of plastic or rubber. However, plastic and rubber both deteriorate with time, particularly since they will be contacting the desiccant which has a high moisture content due to absorption of moisture from the air trapped within the space between the window panes. This moisture can cause deterioration of the rubber. Also, the joint formed by the rubber or plastic end pieces is not as strong as a metal corner joint would be.

It is therefore an object of this invention to provide a cornerpiece for joining the adjacent ends of tubular spacer bars used to separate the panes of glass in a multiple pane window.

It is a further object of this invention to provide a cornerpiece which is lightweight and uses a minimum of material.

It is a still further object of this invention to provide a cornerpiece which is constructed of the same material which the spacer bars are made of, preferably aluminum.

It is a further object of this invention to provide a unitary cornerpiece formed of aluminum sheet and formed so as to block the ends of the spacer tubes to prevent leakage of desiccant from within the spacer tubes.

SUMMARY OF THE INVENTION

In furtherance of the above-stated objects and advantages, and additional objects and advantages which will be more readily apparent from the description below, a cornerpiece for joining the ends of adjacent spacer bars to form a spacer frame for interposition between the adjacent panes of a multiple pane window includes a channel member having a web and a first and a second leg extending from the web. The channel member is bent to form a first and a second arm, each arm being insertable into the end of a tubular spacer bar. The arms of the channel member are formed so as to substantially seal the ends of the tubular spacer bars.

In a preferred embodiment the cornerpiece is integrally formed of a sheet metal.

Also in a preferred embodiment the cornerpiece is formed of sheet aluminum.

BRIEF DESCRIPTION OF THE DRAWINGS

The foregoing objects and advantages of the cornerpiece formed in accordance with the principles of this invention will become more readily apparent to those skilled in the art and others upon reading the ensuing specification in conjunction with the accompanying drawings wherein.

DETAILED DESCRIPTION OF THE PREFERRED EMBODIMENTS

Figure 1:
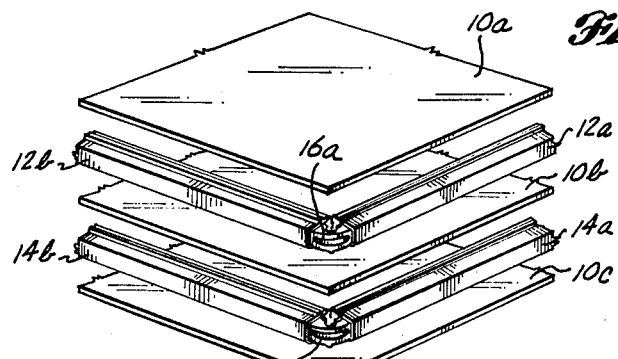
FIG. 1 is an exploded isometric view of a multiple pane window in which cornerpieces made in accordance with the principles of this invention are used to join the tubular spacer bars.

Referring to FIG. 1, a multiple pane window typically consists of two or more panes 10a, 10b, 10c of glass, plastic or other transparent material separated by a frame comprised of tubular spacer bars 12a, 12b, 14a and 14b, adjacent ends of the spacer bars being joined together to form corners, thereby forming a frame which is interposed between the panes 10a, 10b, 10c of the window. The tubular spacer bars of each frame are joined by means of cornerpieces 16a and 16b inserted into the adjacent ends of the spacer bars. In FIG. 1 the window consists of three panes of glass separated by two sets of spacer bars, however, the corner joint of this invention can be used in a window having two panes of glass or more than three, although, typically, an insulating window will have only two or three panes. After the panes and spacer frames are positioned in proximity to one another, a thermoplastic adhesive or other suitable material is injected around the edges of the glass and spacer bars sealing the panes of glass and spacer bars into a single unitary window assembly (not shown).

Typically, each of the tubular spacer bars 12a, 12b, 14a and 14b is filled with a desiccant, for example, silica gel. The desiccant's moisture absorbing properties draw moisture from the air trapped within the space between adjacent window panes 10a and 10b or 10b and 10c bounded by the tubular spacer frame, thereby preventing moisture from collecting on the interior portions of the window panes and fogging the window.

Figure 2:
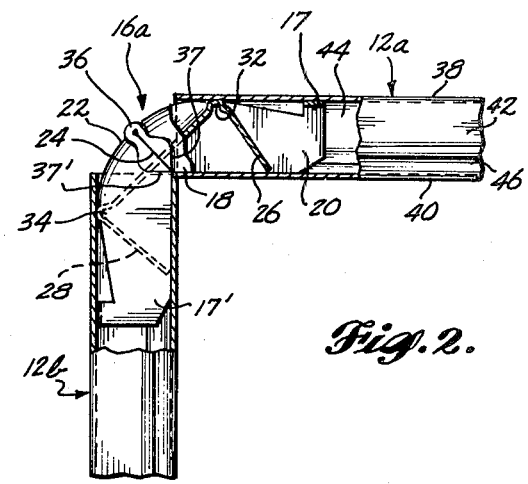
FIG. 2 is a side elevational view partly in section of a cornerpiece formed in accordance with the principles of this invention in assembly with a pair of tubular spacer bars.
Figure 3:
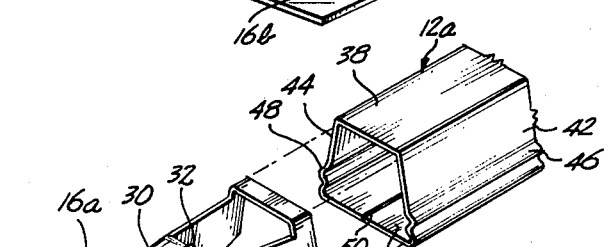
FIG. 3 is an exploded perspective view of the assembly of FIG. 2.
Figure 4:
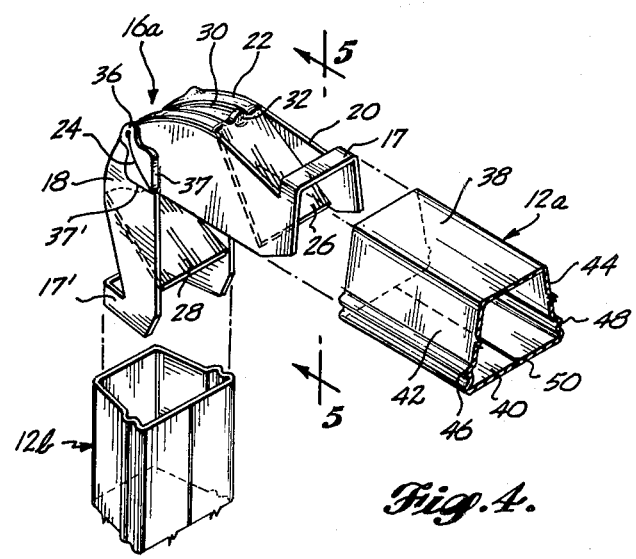
FIG. 4 is also an exploded perspective view of the assembly of FIG. 2 as viewed from a different angle.
Figure 5:
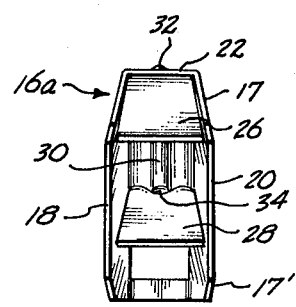
FIG. 5 is a view along line 5—5 of FIG. 4.

Referring now to FIGS. 2 and 3, the cornerpiece 16a formed in accordance with the principles of this invention comprises a channel having first and second planar legs 18 and 20, respectively, in generally parallel spaced relation, the planar legs 18 and 20 being joined along one edge by a web 22. The planar legs 18 and 20 are integrally formed with the web 22 and extend at substantially right angles therefrom and are substantially parallel to each other to thereby form the channel member. The planar legs 18 and 20 diverge slightly as they extend from the web 22, the reason for the divergence will be discussed below. The cornerpiece 16 is bent or shaped to form substantially a right angle thereby forming a first arm 17 and a second arm 17' of the cornerpiece. A slot 24 is formed in the first planar leg 18 of the cornerpiece 16a to enable the cornerpiece to be bent without distortion of the first planar leg 18. A similar slot (not shown) is cut into the second planar leg 20. Preferably, the web 22 forms a smooth curve from the first to the second arms of the cornerpiece 16a. It would be possible, however, to bend the cornerpiece such that a sharp angle is formed in the web 22. A first tab portion 26 in the first arm 17 projects obliquely from the plane of the web 22 downwardly as viewed in FIG. 3. The first tab portion 26 is a four-sided planar member, one edge of which is attached to the web 22, the other three edges of which are free from attachment to the cornerpiece. A similar second tab portion 28 is located in the second arm 17' of the cornerpiece 16a. The tab portions 26 and 28 are angled such that the edges of the tab portion opposite the edges attached to the web 22 converge slightly, as best seen in FIG. 2. The purpose of the tab portions 26, 28 will be explained below. An elongate curvilinear depression 30 is formed in the web 22 and extends approximately from the first tab portion 26 to the second tab portion 28. The elongate curvilinear depression 30 extends generally parallel to the first and second planar legs 18 and 20 and follows the curvature of the web 22. The elongate curvilinear depression 30 provides additional rigidity to the cornerpiece 16a to prevent it from straightening when forces are applied to the arms of the cornerpiece. A first button portion 32 extends upwardly, as viewed in FIG. 3, from the web 22 at the location where one end of the elongate curvilinear depression 30 meets the attached edge of the first tab portion 26. A similar second button portion 34 extends outwardly from the web 22 at the other end of the elongate curvilinear depression 30. The purpose of the button portions 32 and 34 will be discussed later. In actual practice, the tab portions 26 and 28 are preferably formed by bending a portion of the web 22 out of the plane of the web leaving an open section in the web immediately above the tab portions 26 and 28, respectively. A stop 36 extends outwardly from the first planar leg 18 adjacent the slot 24. A similar stop, now shown, extends from the second planar leg 20. The purpose of the stops will be discussed below. Portions of tubular spacer bars 12a and 12b are shown in FIGS. 2, 3 and 4. The spacer bars are generally elongate tubular members and are preferably trapezoidal in transverse action. The spacer bar 12a has a first parallel wall 38, a second parallel wall 40, the first wall 38 being shorter than the second wall 40. A first and a second side wall 42 and 44, respectively, joins the parallel walls 38 and 40 completing formation of a spacer bar 12a. A first elongate protruding section 46 extends from the first side wall 42 near the longer second parallel wall 40. The first elongate protruding section 46 extends transversely in a direction away from the second side wall 44 longitudinally the entire length of the spacer bar 12a. A similar second elongate protruding section 48 extends longitudinally along the second side wall 44 in registry with the first elongate protruding section 46. The tubular spacer bar 12b is identical in construction to tubular spacer bar 12a.

Referring now to FIG. 2, a typical corner joint of a spacer frame to be interposed between adjacent panes of glass in a multiple plane window is formed by inserting the first arm 17 of cornerpiece 16a into one end of the spacer bar 12a and inserting the second arm 17' into the spacer bar 12b. The planar legs 18 and 20 of the cornerpiece 16a extend from the web 22 a distance substantially equal to the distance between the parallel walls 38, 40 of the spacer bar. The web 22 is of substantially equal width to the width of the first parallel wall 38 of the tube and the planar legs 18 and 20 diverge slightly as they extend from the web 22 at an angle substantially equal to the angle of divergence of the first and second side walls 42 and 44 of the tubular spacer bar 12a such that when the cornerpiece 16a is inserted into the spacer bar 12a, the exterior of the web 22 is in contact with the interior of the first parallel wall 38 and the exterior of the first and second planar legs 18 and 20 are in contact with the interior of the first and second side walls 42 and 44, respectively. The first tab portion 26 is of a length and angle sufficient to extend from the first parallel wall 38 to the second parallel wall 40, thereby blocking the end of the tubular spacer bar 12a. Similarly, the second tab portion 28 blocks the end of tubular spacer bar 12b. Typically, the spacer bars 12a and 12b will contain a desiccant such as silica gel, usually in a granular form. The tab portions 26 and 28 prevent the silica gel from escaping from the ends of the spacer bars 12a and 12b respectively. The first arm 17 of cornerpiece 16a is inserted into the spacer bar 12a to a point where the end of the spacer bar 12a abuts a first edge 37 of the stop 36. Likewise, the second arm 17' of the cornerpiece 16a is inserted into the spacer bar 12b until the end of the spacer bar 12b abuts a second adjacent edge 37' of the stop 36. The stop 36 extends from the first planar leg 18 a distance sufficient to block off the first elongate protruding section 46 of the spacer bar to prevent the escape of any desiccant from within the spacer bar 12a by way of the first elongate protruding section 46. Similarly, the second elongate protruding section 48 on the second side wall 44 of the spacer bar 12a is blocked by the stop (not shown) which extends from the second planar leg 20.

During manufacture of the cornerpiece or the tubular spacer bars it is possible that some variation in the size of either the planar legs 18 and 20 or the distance from the first parallel wall 38 to the second parallel wall 40 may occur. The first and second buttons 32 and 34 on the cornerpiece 16a are provided to insure a close fit of the cornerpiece 16a into the spacer bars 12a, 12b. The spacer bars are preferably made of aluminum sheet so that, in the event such size variations do occur, the spacer bar walls will be pliable enough so that, should the spacer bar be slightly undersized or the cornerpiece slightly oversized, the first parallel wall 38 will yield sufficiently to allow the cornerpiece and button to fit within it. Should the spacer bar be slightly oversized or the cornerpiece slightly undersized, the existence of the button 32 or 34 will insure that a tight fit exists when the cornerpiece 16a is inserted into the spacer bars 12a or 12b. Also, in the event the spacer bars are constructed of rolled, formed sheet metal having a seam 50 as shown in FIG. 3, there is a chance that during the manufacturing process, if the proper tension is not maintained on the rolling and forming device, the edges of the sheet metal forming seam 50 will not properly abut one another and an overly large gap will be present which will allow the escape of any desiccant which has been pulverized sufficiently to form a powder. To prevent this, the buttons 32 and 34, respectively, provide a tight, close fit of the cornerpiece into the spacer bar exerting a tension in a direction generally orthogonal to the parallel walls 38, 40 which tension tends to close the seam 50, thereby preventing the escape of any desiccant through the seam.

Although, in FIG. 2, the corner is shown as being approximately 90° between spacer bar 12a and spacer bar 12b, it is possible to construct a frame having more than four sides and, therefore, corner angles greater than 90°. To accomplish this, the cornerpiece 16a, rather than being bent to an approximately right angle, could be bent to some other angle, depending on the polygon to be formed. The cornerpiece would function in exactly the same manner except for the variation in angle of bend. It is also possible that spacer bars 12a and 12b may not be trapezoidal in cross section, but rather square or rectangular. In such a circumstance, the cornerpiece could be formed appropriately to be closely received within the square or rectangular cross section spacer bar merely by varying the size of the web and legs and the angle of divergence of the legs as they extend from the web.

Figure 6:
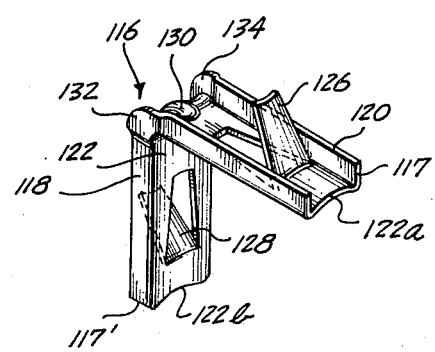
FIG. 6 is a perspective view of another embodiment of a cornerpiece made in accordance with the principles of this invention.

Referring now to FIG. 6, another embodiment of a cornerpiece made in accordance with the principles of this invention comprises a channel member 116 formed of first and second legs 118 and 120, respectively, joined by a web 122. The legs 118 and 120 and the web 122 are integrally formed such that the side walls 118 and 120 extend from the web 122 in generally parallel spaced relation forming the channel member 116. The channel member 116 is bent at which is substantially a right angle forming a first arm 117 and a second arm 117'. The portion of legs 118 and 120 in the first arm 117 of the cornerpiece 116 extend upwardly, as viewed in FIG. 6, and the portions of the legs 118 and 120 in the second arm 117' of the cornerpiece extend to the left, as viewed in FIG. 6. A first tab portion 126 extends from the web 122 in the first arm 117 spaced from a first end 122a of the web. The tab portion 126 extends from the web in the same direction as the proximate portions of the legs 118 and 120. A second tab portion 128 extends from the web 122 in the second arm 117' spaced from a second end 122b of the web in the same direction as the proximate portions of the legs 118 and 120. A dimple 130 is preferably formed in the web 122 at its bend. The dimple 130 adds rigidity to the cornerpiece to increase the force necessary to straighten the channel member 116. Preferably the web 122 is curved as it extends from first leg 118 to second leg 120, the curve of the web 122 adding strength and rigidity to prevent unwanted bending and deformation of the web 122. A first stop 132 extends outwardly from the first leg 118 and a second stop 134 extends outwardly from the second leg 120. Both stops 132 and 134 are located adjacent the bend of the channel member 116.

Similarly to the assembly shown in FIG. 2, the cornerpiece shown in FIG. 6 is utilized to form a corner of a spacer bar frame by inserting the first arm 117 into a first spacer bar (not shown) and the second arm 117' of the cornerpiece into an orthogonally oriented second spacer bar (also not shown). The arms 117 and 117' of the cornerpiece are inserted in the spacer bars such that the ends of the spacer bars abut the associated sides of the stops 132 and 134 and the adjacent walls of the spacer bars abut one another forming a corner similar to that shown in FIG. 2. As was mentioned above, although the channel member 116 is shown as being bent at an approximately right angle, the angle of bend can be varied, depending on the angle of the corner which is desired in the spacer bar frame.

When the first arm 117 of the cornerpiece is inserted into the tubular spacer bar, the underside of the web 122 contacts the interior of the lower wall of the spacer bar, as viewed in FIG. 6. The tab portion 126 extends from the lower wall to the upper wall and is of a width sufficient to block the spacer bar to prevent the loss of any desiccant from within the spacer bar. Although many variations in the cornerpiece can be made, preferably, the walls 118 and 120 extend from the web 122 a distance equal to the distance from the lower wall of the spacer bar to the elongate protruding portion. The width of the web 122 is such that the exterior surfaces of the side walls 118 and 120 contact the interior surfaces of the side walls of the spacer bar tubes.

Figure 7:
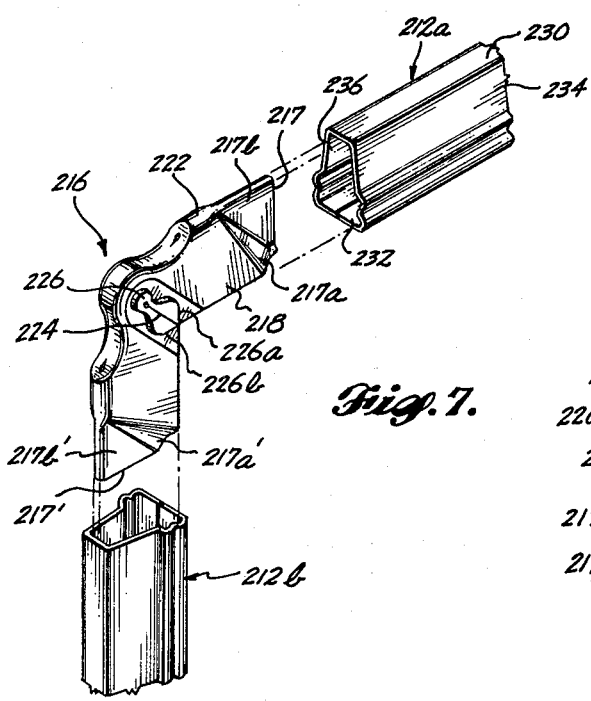
FIG. 7 is a perspective view of yet another embodiment of a cornerpiece made in accordance with the principles of this invention positioned for assembly with a pair of tubular spacer bars.
Figure 8:
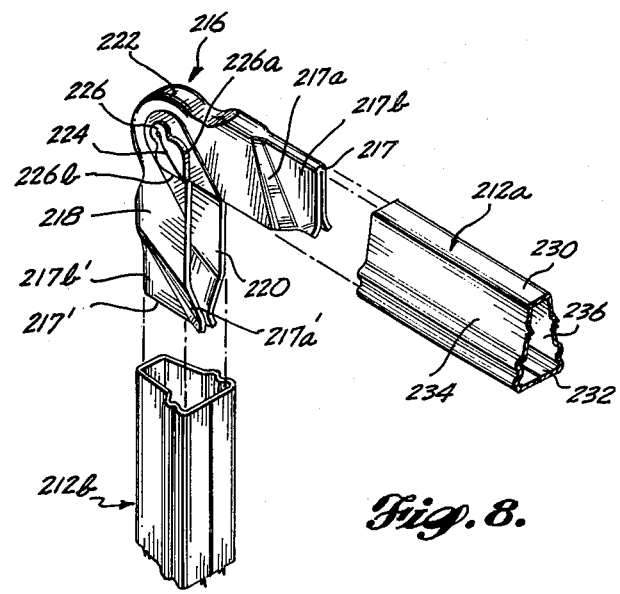
FIG. 8 is a perspective view of the cornerpiece and tubular spacer bars of FIG. 7 viewed from a different angle.
Figure 9:
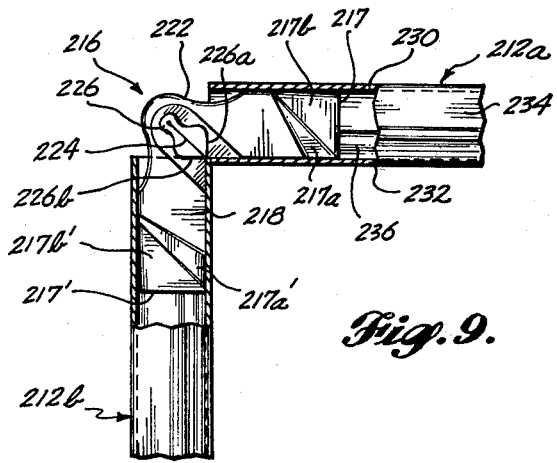
FIG. 9 is a side elevational view partly in section of the cornerpiece and spacer bars of FIGS. 7 and 8 in assembly.

It has been found that for spacer bars of a width of one-half inch or above, the cornerpiece shown in FIGS. 2, 3 and 4 is the preferred cornerpiece to be used. For spacer bars of a width of five-sixteenths and up it is possible to use the cornerpiece shown in FIG. 6. However, for sizes below approximately five-sixteenths of an inch the width of the web is such that it is practically impossible from a manufacturing standpoint to form a tab portion oblique to the web. It is, therefore, necessary to close the end of the cornerpiece in a different manner in order to block the end of the spacer bar. FIGS. 7, 8 and 9 show another embodiment of a cornerpiece made in accordance with the principles of this invention preferably for use in a spacer bar of width approximately one-quarter inch. The cornerpiece comprises a channel member 216 having a first and a second leg 218 and 220, respectively, joined by a web 222. The legs 218 and 220 are in generally parallel spaced relationship and extend substantially orthogonally from the web 222. The channel member 216 is bent in approximately a right angle forming a first arm 217 and a second arm 217' generally orthogonal to the first arm 217. The portion of first leg 218 and second leg 220 which are located in first arm 217 extend along the elongate dimensions of the first arm 217 away from the bend in channel member 216 in substantially parallel relation and then coverage to form a first transition portion 217a. The legs 218 and 220 extend from the transition portion in parallel relation, the adjacent surfaces of the legs being in contact with one another to form a first end portion 217b.

The portion of the legs 218, 220 in the second arm 217' similarly form a second transition portion 217a' and a second end portion 217b'.

The web 222 is the area of the bend and in the areas adjacent the bend is preferably curved, the curve adding structural strength to the cornerpiece. A slot 224 is formed in the first leg 218 and a similar slot (not shown) is formed in the second leg 220 in the area of the bend of the cornerpiece to allow the cornerpiece to be bent without undue distortion of the legs 218 and 220. A stop 226 extends outwardly from the first leg 218 adjacent the slot 224 and a similar stop (not shown) extends from the second leg 220. The stop 224 has two adjacent sides 226a and 226b which join at a substantially right angle. The corner joint of the spacer frame is formed by inserting the first arm 217 of the cornerpiece into a tubular spacer bar 212a and the second arm 217' of the cornerpiece into a second tubular spacer bar 212b until the ends of the spacer bars abut the sides 226a, 226b. The dimensions of the cornerpiece are such that it is closely received by the tubular spacer bars 212a, 212b. As can be seen from FIG. 9, the dimensions of the cornerpiece are such that when the first arm 217 is within the spacer bar 212a the web 222 is in contact with an upper wall 230 of the spacer bar 212a and the respective lower edges of the legs 218 and 220, as viewed in FIG. 9, are in contact with a lower wall 232 of the spacer bar 212a. The interior of the spacer bar is sealed against the flow of desiccant by the end portion 217b and transition portion 217a of the first arm 217. The legs 218 and 220 diverge slightly as they extend from the web 222 at approximately an equal angle to the divergence of side walls 234 and 236 of the tubular spacer bar 212a. The side walls 234 and 236 extend from the upper wall 230 to the lower wall 232. The second arm 217' coacts with the spacer bar 212b in the manner.

Figure 10:
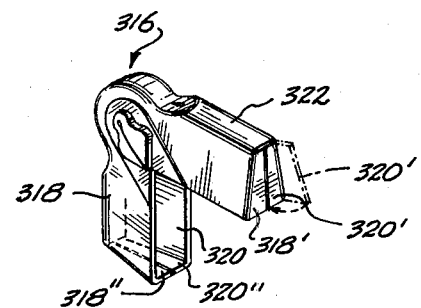
FIG. 10 is a perspective view of another embodiment of a cornerpiece made in accordance with the principles of this invention.

An alternate method of forming the arms of the cornerpiece to block the interior of the spacer bar is shown in FIG. 10. The channel member 316 is essentially identical in shape to the channel member 216 except for the structure utilized as the blocking means in channel member 216. Channel member 316 has first and second arms 317 and 317', respectively, in generally orthogonal relationship. The extension walls 318' and 320' are orthogonal to their respective legs 318 and 320 and abut one another and also abut the web 322 along a top edge of the extension walls 318',320', thereby closing the end of the first arm 317. A similar arrangement is formed on the second arm 317' of the channel member 316 by third and fourth extension walls 318" and 320" which extend respectively from the portion of legs 318, 320 in second arm 317' to close the end of the second arm 317'. The preferable method of forming the closed end of the arms is by folding the ends of the legs toward one another. Although the illustrated embodiment shows the extension walls as being orthogonal to the legs, the extension walls can be at any angle to the legs so long as the extension walls abut one another and close off the ends of the arms 317 and 317'.

While some typical sizes of spacer bars have been mentioned herein and a preferred embodiment of the cornerpiece of the present invention was described and illustrated for each of the various sizes, it will be understood that a person skilled in the art can make modifications to the illustrated embodiment, and without undue experimentation can determine which of the embodiments best adapts itself to the particular size and type of spacer bar being used. The size preferences given above are meant to be exemplary only and are not meant to be limiting in nature.

Preferably, the spacer bars and cornerpieces are made of aluminum or aluminum alloy so as to be both lightweight and have structural strength. The spacer bar tube can be formed of sheet metal in any conventional manner such as rolling and stamping into tubular shape. The cornerpieces are preferably stamped by dies in a conventional manner from a continuous roll of strip aluminum. However, the aluminum could be cut into the appropriate length and each individual length fed to the stamping apparatus. After forming, the cornerpieces can be used as is or they can be acid etched and polished, anodized or treated in any other conventional manner. It is preferable to form the spacer bars and cornerpieces from the same metal so that electrolytic reaction between the two pieces is kept at a minimum, thereby slowing the process of deterioration and increasing the useful life of the spacer frame.

It will be appreciated by those skilled in the art and others that it is possible to form the ends of the arms of the various embodiments of the cornerpiece of this invention so as to allow communication between adjacent spacer bars. For example, in the cornerpiece 16a of FIGS. 2, 3, and 4, the tab portions 26, 28 could remain in the plane of the web 22. Also, in channel member 116 in FIG. 6, the tab portions 126, 128 could remain in the plane of the web 122. The arms of the channel member 216 could likewise be left open by eliminating the transition portions 217a, 217a' and the end portions 217b, 217b'. The same result can be effected in the channel member 316 by eliminating the extension wall 318', 318", 320' and 320". Opening the arms of the cornerpieces would allow a free flow of desiccant around the entire perimeter of the assembled frame.

It will be understood by those skilled in the art and others that the cornerpieces can be made of materials other than aluminum, for example, some other sheet metal or plastic. While a number of embodiments have been described and illustrated, it will be understood by those skilled in the art and others that various other changes can be made to the cornerpiece of the present invention while remaining within the spirit and scope of the invention.

The embodiments of the invention in which an exclusive property or privilege is claimed are defined as follows:

1. A cornerpiece for joining adjacent tubular spacer bars in a spacer frame, said bars containing a granular desiccant, said cornerpiece comprising:
   a channel member having a web;
   first and second legs extending substantially orthogonally from said web in substantially parallel spaced relation, said channel member being bent to form first and second elongate arms, each of said first and second arms being insertable into an associated one of said spacer bars, said first and second legs of said first arm extending along the elongate dimension of said first arm and then converging toward one another to form a first transition portion, the legs then extending from said first transition portion in parallel relation to one another and in contact with one another to form a first end portion of said first arm, said first and second legs extending from said web a distance such that when said first arm is inserted into its associated spacer bar the spacer bar is substantially sealed by said first end portion and transition portion of said first arm, said first and second legs of said second arm extending along the elongate dimension of said second arm and then converging toward one another to form a second transition portion, said first and second legs of said second arm extending from said second transition portion in substantially parallel relation in contact with one another to form a second end portion, said first and second legs of said second arm extending from said web a distance such that when said second arm is inserted in its spacer bar, the spacer bar is substantially sealed by the second end portion and second transition portion of said second arm.

2. The cornerpiece of claim 1 wherein said first and second arms are substantially orthogonal to one another.

3. The cornerpiece of claim 1 wherein said cornerpiece is integrally formed of sheet metal.

4. The cornerpiece of claim 1 wherein said cornerpiece is formed of aluminum.

5. The cornerpiece of claim 1 further including stop means affixed to said first and second legs adjacent the bend of said channel member, said stop means comprising a raised portion extending from each of said first and second legs positioned and constructed so as to abut the adjacent ends of said spacer bars when said cornerpiece is inserted into said spacer bars to provide a positive stop for maintaining the predetermined orientation of the spacer bars in the spacer frame.

6. In a multiple pane window unit having at least two panes, a frame for separating adjacent ones of said panes, said frame comprising:
a plurality of hollow tubular spacer bars;
a plurality of sheet metal cornerpieces for joining each pair of adjacent bars to form a continuous frame for interposition between said adjacent panes, said cornerpieces comprising a channel member having a web, a first and second leg extending substantially orthogonally from said web in substantially parallel spaced relation, said channel member being bent to form a first arm and a second arm, each of said first and second arms being inserted into and closely received by an associated one of said tubular spacer bars, said first and second legs of said first arm extending along the elongate dimension of said first arm and then converging toward one another to form a first transition portion, the first and second legs then extending from the first transition portion in substantially parallel relation to one another and in contact with one another to form a first end portion of said first arm, said first and second legs extending from said web a distance such that when said first arm is inserted into its associated spacer bar, the spacer bar is substantially sealed by the end portion and transition portion of said first arm, said first and second legs of said second arm extending along the elongate dimension of said second arm then converging toward one another to form a second transition portion, said first and second legs extending from said second transition portion in substantially parallel relation and in contact with one another to form a second end portion, said first and second legs of said second arm extending from said web a distance such that when said second arm is inserted into its associated spacer bar, the spacer bar is substantially sealed by the second end portion and second transition portion of said second arm.

7. The frame of claim 6 wherein said cornerpieces are integrally formed of sheet metal.

8. The frame of claim 6 wherein said first and second arms of said cornerpieces are in substantially orthogonal relationship to one another.

9. A cornerpiece for joining adjacent tubular spacer bars in a spacer frame, said bars containing a granular desiccant, said cornerpice comprising:
a channel member of U-shaped cross-section having a web and first and second legs extending substantially orthogonally from said web, said channel member bent being to form a first elongate arm, a second elongate arm and a junction portion intermediate said first and second arms, each of said first and second arms being insertable into an associated one of said adjacent spacer bars, said first and second legs extending from said web a distance sufficient to provide an interference fit between said arm and its associated spacer bar, each of said first and second arms including first and second tab portions respectively, said tab portions extending obliquely from said web in the same direction and substantially co-extensive with the extension of said legs from said web, each of said tab portions being located intermediate said legs and contained within its associated arm to substantially seal the ends of said spacer bars when said arms are inserted into their associated spacer bars.

10. The cornerpiece of claim 9 wherein said web in said junction portion has an elongate depression formed therein, said depression extending substantially the length of said junction portion, being recessed in the direction of extension of said legs from said web.

11. The cornerpiece of claim 9 or 10 wherein said cornerpiece is integrally formed of sheet metal.

12. The cornerpiece of claim 9 or 10 wherein said first and second arms are substantially orthogonal to one another.

13. The cornerpiece of claim 9 further including positioning means associated with said first and second legs to provide a positive stop for the cornerpiece arms as they are inserted into their associated spacer bars, said positioning means including a first stop member extending transversely from said first leg adjacent said junction portion and a second stop member extending transversely from said second leg adjacent said junction portion, said first and second stop members being so positioned and constructed that they abut the ends of said adjacent spacer bars when said arms are properly positioned within said spacer bars.

14. A cornerpiece for joining adjacent tubular spacer bars in a spacer frame, said bars containing a granular desiccant, said cornerpice comprising:
a channel member of U-shaped cross-section, having a web and first and second legs extending substantially orthogonally in spaced relation from said web, said channel member being bent to form a first elongate arm, a second elongate arm and a junction portion intermediate said first and second arms, said first arm including a first endwall extending substantially orthogonally from said first leg in the direction of said second leg and a second endwall extending substantially orthogonally from said second leg in the direction of said first leg, said first and second endwalls abutting one another so as to close off the end of said first arm, said second arm including a first endwall extending orthogonally from said first leg in the direction of said second leg and a second endwall extending orthogonally from said second leg in the direction of said first leg, said first and second endwalls abutting one another to close off the end of said second arm.

15. In a spacer frame having a plurality of spacer bars joined together to form a continuous frame, each of said spacer bars containing a granular desiccant, an improved cornerpiece for joining adjacent ones of said spacer bars, said cornerpiece comprising:

a channel member of U-shaped cross section, said channel member having a web and first and second legs extending orthogonally from said web in spaced relation, said channel member being bent to form first and second elongate arms and a junction portion intermediate said first and second arms, said arms being insertable into adjacent ones of said spacer bars, said arms further including a first and second tab portion respectively, said tab portion extending obliquely from said web in the direction toward said junction portion of said cornerpiece, each of said tab portions being of a size sufficient to seal the ends of the associated spacer bars against the transfer of dessicant, each of said tab portions extending from said web a distance sufficient to contact an interior wall of said spacer bar when said cornerpiece is in position with said frame.

16. The cornerpiece of claim 15 wherein said web further has a depression formed therein within said junction portion of said cornerpiece, said depression extending substantially the length of said junction portion.

* * * * *

UNITED STATES PATENT AND TRADEMARK OFFICE
CERTIFICATE OF CORRECTION

PATENT NO. : 4,222,209

DATED : September 16, 1980

INVENTOR(S) : Wallace H. Peterson

It is certified that error appears in the above-identified patent and that said Letters Patent are hereby corrected as shown below:

Column 4, line 12: "now" is changed to --not--.

Column 5, line 65: "which" is changed to --what--.

Column 7, line 9: "coverage" is changed to --converge--.

Column 7, line 17: "is" is changed to --in--.

Column 7, line 49: --same-- is inserted before "manner".

Column 10, line 25; Claim 9, line 7: "bent being" is changed to --being bent--.

Signed and Sealed this

Seventeenth Day of November 1981

[SEAL]

Attest:

GERALD J. MOSSINGHOFF

*Attesting Officer*   *Commissioner of Patents and Trademarks*